Patented Oct. 23, 1934

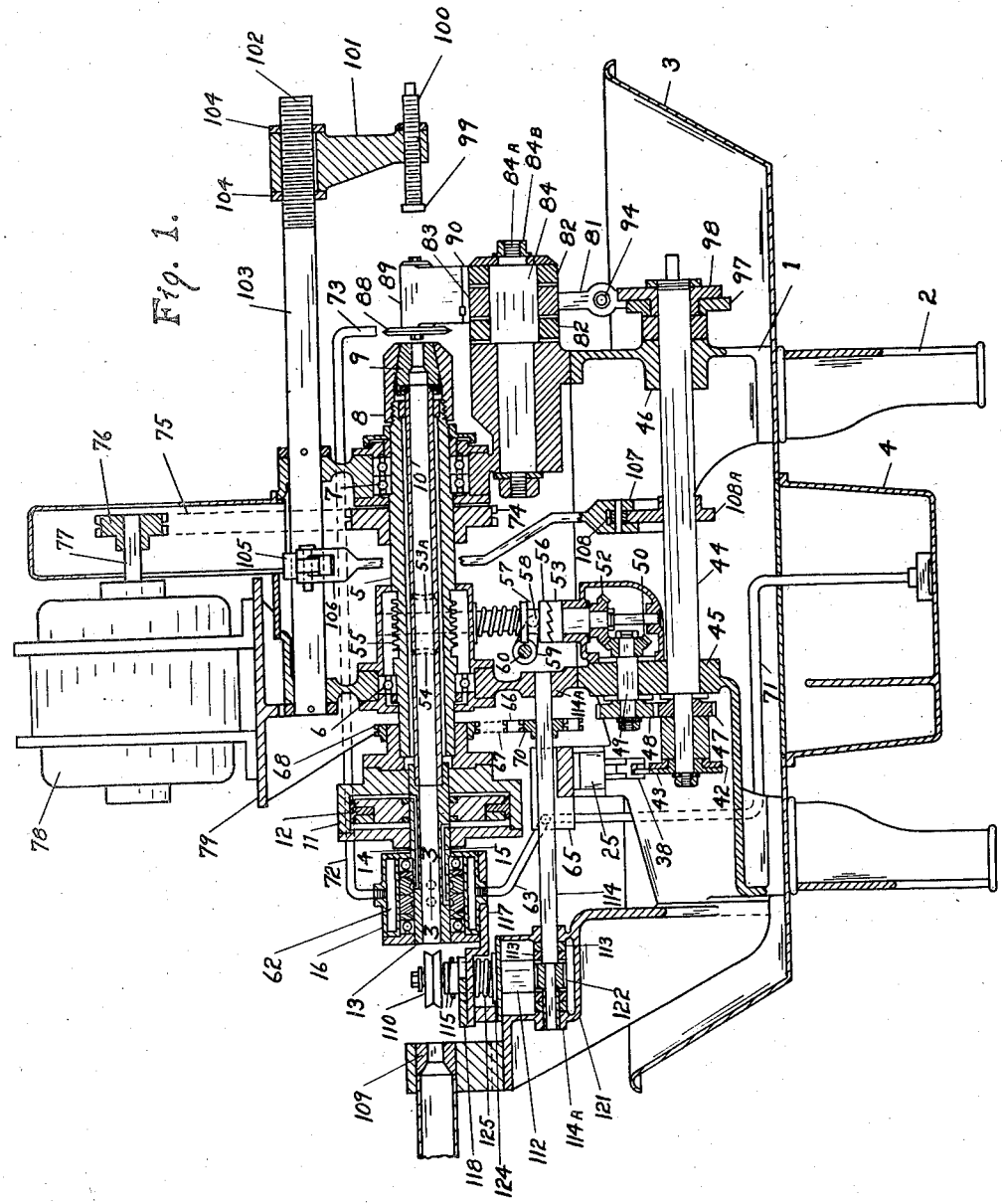

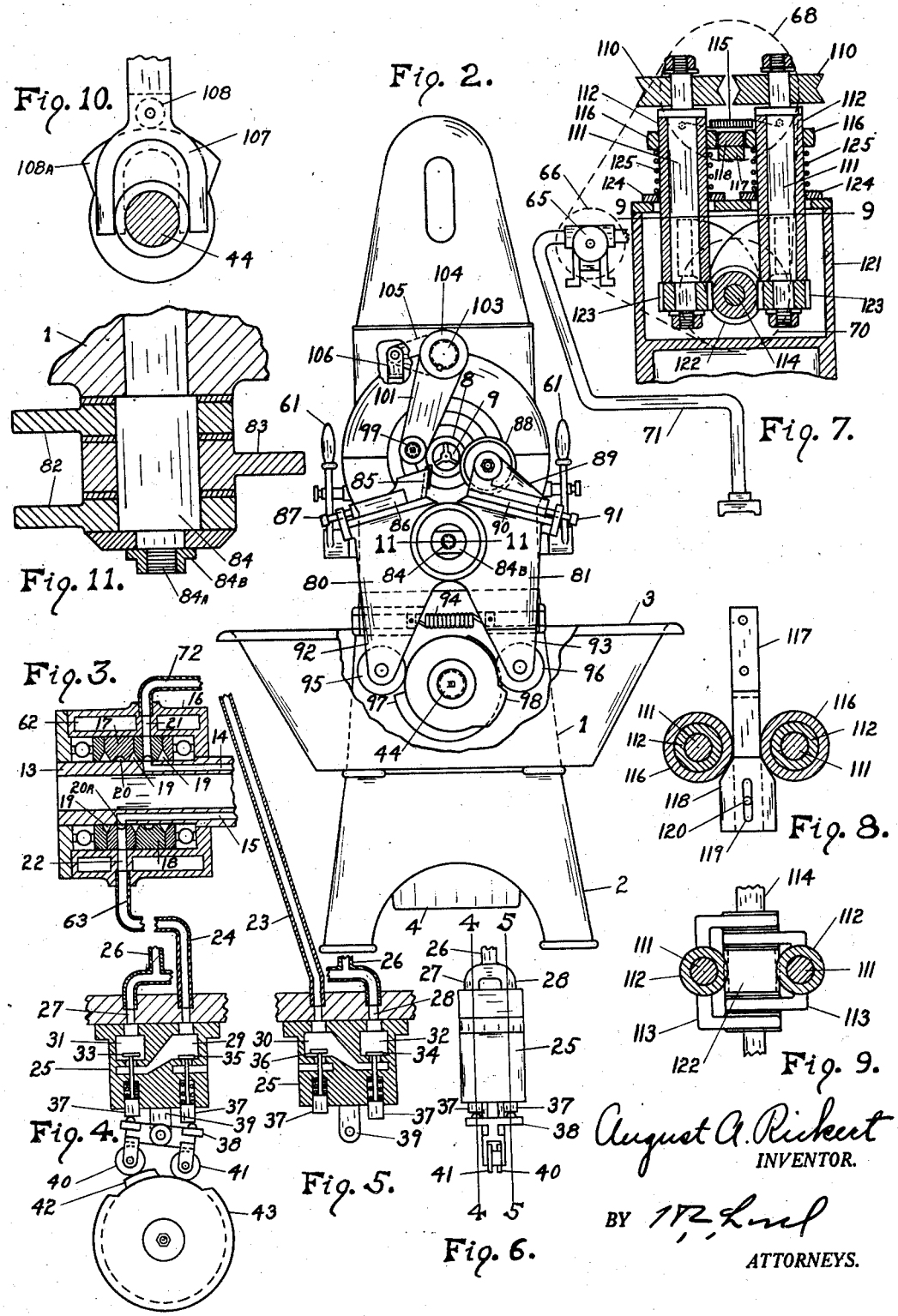

1,978,060

UNITED STATES PATENT OFFICE 1,978,060

WORK FEEDING DEVICE

August A. Rickert, Erie, Pa., assignor to Rickert-Shafer Company, Erie, Pa., a corporation of Pennsylvania Application August 18, 1931, Serial No. 557,792

4 Claims. (Cl. 29—63)

The present invention is designed to feed work to a rotating spindle having a collet by means of which the work is engaged and disengaged and fed forward by the feeding device. The feeding device utilizes feed rollers and these are continuously operated but are brought into engagement with the work at intervals and during the period that the machine is operating upon the work. The feed rolls are separated from the work, thus eliminating wear and reducing power consumption. The invention contemplates a simplification of the mounting and operation of these feed rolls, particularly in connection with an air-operated collet. Features and details of the invention will appear from the specification and claims.

A preferred embodiment of the invention is illustrated in the accompanying drawings as follows:—

Fig. 1 shows a vertical section of the machine.

Fig. 2 an end view of the cutting end of the machine.

Fig. 3 an enlarged section of the air connecting means on the line 3—3 in Fig. 1.

Fig. 4 an enlarged view of the valve on the line 4—4 in Fig. 6.

Fig. 5 a section of the valve on the line 5—5 in Fig. 6.

Fig. 6 an end view of the valve.

Fig. 7 an end view of the feeding mechanism.

Fig. 8 a top view of the feed rolls showing the separating cam.

Fig. 9 a section of the feed roll mounting on the line 9—9 in Fig. 7.

Fig. 10 a side elevation of the stop actuating cam and yoke.

Fig. 11 a section on the line 11—11 in Fig. 2.

1 marks the frame of the machine. This is mounted on legs 2. It is provided with the usual lubricant and chip-receiving pan 3, and 4 a sump to which the lubricant flows from the pan.

The machine has a spindle 5 which is mounted in ball bearings 6 and 7. A collet throat 8 is mounted on the front end of the spindle and is provided with collet jaws 9 of usual construction. A collet-actuating tube 10 extends from the jaws through the center of the spindle.

An air ring 11 is mounted on the rear of the spindle, and a piston 12 is arranged in this cylinder and is mounted on an extension 13 secured on the rear end of the jaw-actuating tube 10. Air is delivered to the opposite ends of the cylinder through air passages 14 and 15 arranged in the extension 13. An air-connecting housing 16 is mounted on the extension. It is provided with rings 17 and 18 which are sealed on the extension by packing rings 19. The rings 17 and 18 have annular grooves 20 and 20a which maintain a constant connection with the air passages 14 and 15 as the extension rotates. Air is delivered to the rings 17 and 18 through passages 21 and 22 respectively, these passages being supplied from pipes or hose 23 and 24.

The air is controlled by a valve 25 receiving its supply from a pipe 26 with branches leading to inlets 27 and 28. Ports 29 and 30 are connected with the pipes 23 and 24 and ports 31 and 32 are connected with the passages 27 and 28 respectively and these are controlled by valves 33 and 34. Valves 35 and 36 control exhausts from the ports 29 and 30. All of these valves, four in number, are provided with stems 37 and are actuated from a rocker 38, the rocker being pivotally mounted on arms 39 extending from the valve. The rocker is provided with rollers 40 and 41 which are actuated by cams 42 and 43 respectively. Each side of the rocker is provided with two contacts engaging two of the valve pins and as the rollers 40 and 41 are lifted an inlet and exhaust valve at the side lifted is opened. In other words, the air is alternately delivered to one side of the cylinder 11 and exhausted from the other and the cams 42 and 43 controlling this movement are so timed that with each cycle of the machine the tube 8 is retracted releasing the jaws, held open an interval permitting the feeding of the material and then closed through the action of the air and held closed through the action of the air during the cutting operation. The cams are mounted on a shaft 44 and this shaft is journaled in bearings 45 and 46 in the frame. A gear 47 is fixed on the shaft 44 and meshes with a gear 48. The gear 48 is fixed on a shaft 49 journaled in the frame. A beveled gear 50 is fixed on the shaft 49 and meshes with a beveled gear 52. The beveled gear 52 is fixed on a shaft 53 mounted in a bearing in the frame. A shaft 53a (see dotted lines) extends upwardly from the shaft 53 and is provided with a worm 54 which is driven by a worm 55 on the spindle. A clutch 56 is adapted to lock the shaft 53a with the shaft 53. One of the clutch members has a groove 57 which is engaged by trunnions 58 carried by arms 59. The arms 59 are fixed on a shaft 60 which is actuated by hand levers 61, one of such levers being provided at each side of the machine for convenience. Thus the valve control is hooked up and driven from the spindle and the valve control and consequently the operation of the jaws may be thrown out by the operation of the lever 61.

The air-connecting housing must be maintained air tight on the spindle and this involves considerable heat. In order to obviate undue heating, I provide this connecting ring with a cooling cavity 62. This is connected by a pipe 63 with a pump 65. The pump is of the rotary type and driven by a sprocket 66, a chain 67 meshing with the sprocket and with a sprocket 68 on the spindle. The chain also engages a sprocket 70 for driving the feed rolls hereinafter described. The pump has an intake 71 which extends down into the sump 4 and thus draws up cutting lubricant from the sump and delivers the same to the cooling cavity 62. The lubricant passes from the cooling cavity by way of a pipe 72 to a discharge nozzle 73 directly at the work. Thus the cutting lubricant is utilized for cooling the air housing.

The spindle is provided with a sprocket 74 and a chain 75 actuates this sprocket, the chain getting its movement from a sprocket 76. The sprocket 76 is mounted on a rotor shaft 77 of an electric motor 78, the motor being mounted on a platform 79 extending from the frame.

Tool posts 80 and 81 have arms 82 anad 83 overlapping and journaled on a stud 84 extending from the frame, this stud being of large dimensions and so mounted as to give great rigidity. It has a screw-threaded end 84a with a nut 84b permitting the ready assembly of the posts.

The cutting is accomplished preferably by two tools, one a direct cutting tool, and the other a roller. The direct cutting tool 85, which makes the initial cut and the chamfer and prevents the formation of a burr, is adjustably mounted in guides 86 and is provided with an adjusting screw 87. The guides 86 are mounted on the post 80. A roller cutter 88 is mounted on a slide 89 and this slide is mounted in guides 90, said slide being made adjustable by a screw 91. The slide 89 is mounted on the post 81. The roller supplements the cutting tool and completes the cut off.

The posts 80 and 81 have operating arms 92 and 93 extending below the posts. These are drawn toward each other by means of a spring 94 arranged between these arms, the effect of the spring being to retract the cutting tools. The arms 92 and 93 are provided with cam rollers 95 and 96 respectively and these rollers operate upon cams 97 and 98 respectively. The cams are mounted on the shaft 44 and are thus properly timed with relation to the valve control to retract the cutting tools at the completion of a cut, hold the tools open sufficiently to permit the advance of the work, and advance the cutting tools in proper sequence to complete the cut, the major portion of the cut being accomplished by the cutting tool and the finishing cut by the roller cutter in order to avoid a burr and to provide a chamfer at the edge. A stop 99 is provided in the path of the work as it is advanced. This stop is mounted on a screw 100 which is arranged in an arm 101, the screw providing means of adjustment of the stop. The arm 101 is mounted on a screw 102 extending from a shaft 103. The arm 101 is made adjustable by means of nuts 104 operating on the screw. An arm 105 is fixed on the shaft 103 and a push rod 106 is connected with the arm 105. The lower end of the push rod has a yoke 107 straddling the shaft 44. A roller 108 is carried by the push rod and engages a cam 108a, the cam being arranged to lift the rod in proper time to move the stop out of engagement with the work at the completion of the cut so that the cut-off portion may be readily released and to return the stop to stop position in time to receive the work as it is fed forward. A work guide 109 is carried by the frame. Feed rolls 110 are arranged in front of the guide and the pass between the rolls being in alinement with the axis of the spindle. The rolls are splined on shafts 111, the shafts being journaled in sleeves 112. The sleeves are carried by arms 113 and the arms are swingingly mounted on a shaft 114. A spring 115 draws the sleeves toward each other and consequently draws the rolls together for engagement on the work being fed. Rollers 116 are arranged on the sleeves 112 and a cam bar 117 is secured on the air housing 16 and is, therefore, moved forward and back with the jaw-operating tube 10. The cam bar has a cam plate 118 which operating on the rollers 116 spreads the feed rollers 110 to a position out of engagement with the work. This forward movement of the cam plate 118 takes place as the operating tube 10 is moved forward to close the collet so that the feed rollers are out of engagement with the work during the time that the cutting operation is taking place and during the time that the work is rotating. The plate 118 has a slot 119. A screw 120 extends through the slot into the bar 117 thus forming a means of adjustment.

A helical gear 122 is mounted on the shaft 114. This shaft is mounted in bearings 114a in the frame and has the sprocket 70 heretofore referred to secured thereon. The sprocket 70 as heretofore described is driven by the chain 67 from the spindle. The helical gear 122 meshes with gears 123 at the bottom ends of the shafts 111. Consequently the feed rollers are constantly rotated. The mounting of the sleeves 111 through the arms 113 on the shaft 114 makes the pivotal movement of the sleeves 111 through the action of the cam plate around the axis of the shaft 114 so that during this movement the engagement of the gears 123 with the gear 122 is not disturbed. The gears 122 and 123 and the lower part of the sleeves are in a box 121. Closure plates 124 are arranged on the top of the box and are held in contact by springs 125 arranged around the sleeves. The rolls 110 are free to move axially on the shafts 111 to permit them to center on different diameters of work.

In the operation of the feeding device as the air control opens the collet the extension 13 moves with the operating tube and carries with it the air ring housing 16 and operating cam plate 117 so as to move the cam 118 to the rear permitting the sleeves to carry the operating rollers into engagement with the work. The work is, therefore, immediately fed forward through the action of the rollers and as soon as this movement of the work is completed the air valves are timed to operate, the collet is closed through the forward movement of the tube 10 and this draws the cam plate 117 forward and the cam 118 spreads the sleeves and moves the feed rollers out of engagement with the work and this position is maintained until, in the cycle of the machine, the cutting is completed and the collet is again opened to permit of the forward feeding of the work.

What I claim as new is:—

1. In a machine of the character described, the combination of a spindle; a collet in the spindle; a collet actuating member; a reciprocating air-actuating means operating the member in which the spindle is journaled; an air housing distributing air to the opposite sides of the means; an air valve controlling the air delivered to the means; and means circulating cooling fluid in cooling relation with the housing.

2. In a machine of the character described, the combination of a spindle; a collet in the spindle; a collet actuating member; a reciprocating air-actuating means operating the member in which the spindle is journaled; an air housing distributing air to the opposite sides of the means; an air valve controlling the air delivered to the means; and means collecting and delivering cutting lubricant to work carried by the spindle comprising a cooling device for the housing carrying cutting lubricant into cooling relation with the housing.

3. In a machine of the character described, the combination of a spindle; a collet on the spindle; a collet actuating member; a reciprocating air-actuated means operating the member; feed rolls having a pass in alinement with the axis of the spindle; mountings for the rolls; means for driving the rolls continuously; and devices actuated by the air-actuated means operating the mountings to retract and advance the feed rolls from and to feeding position.

4. In a machine of the character described, the combination of a spindle; a pair of feed rolls having a pass in alinement with the spindle; a drive shaft; roll shafts on which the rolls are mounted, said rolls being rotatively locked, but free to move axially to permit the rolls to center on different diameters of work; sleeves in which the roll shafts are journaled; pivotal mountings for the sleeves on the drive shaft; gears fixed on the roll shafts; and a gear on the driving shaft meshing with said gears.

AUGUST A. RICKERT.